US012762436B2

(12) United States Patent
McCarthy et al.

(10) Patent No.: US 12,762,436 B2
(45) Date of Patent: Oct. 13, 2026

(54) CAUSAL INFERENCE FOR OPTIMIZED RESOURCE ALLOCATION

(71) Applicant: Optum Services (Ireland) Limited, Dublin (IE)

(72) Inventors: Michael J. McCarthy, Dublin (IE); Conor J. Waldron, Dublin (IE); Kieran O'Donoghue, Dublin (IE); Kevin A. Heath, Dublin (IE)

(73) Assignee: Optum Services (Ireland) Limited, Dublin (IE)

( * ) Notice: Subject to any disclaimer, the term of this patent is extended or adjusted under 35 U.S.C. 154(b) by 849 days.

(21) Appl. No.: 17/935,392

(22) Filed: Sep. 26, 2022

(65) Prior Publication Data

US 2024/0104407 A1 Mar. 28, 2024

(51) Int. Cl.
*G06N 5/04* (2023.01)
*G06F 9/50* (2006.01)

(52) U.S. Cl.
CPC ............. *G06N 5/04* (2013.01); *G06F 9/5027* (2013.01)

(58) Field of Classification Search
CPC ...... G06N 5/04; G06N 20/00; G06Q 10/0631; G06F 9/5027; G06F 9/5005
See application file for complete search history.

(56) References Cited

U.S. PATENT DOCUMENTS 8,027,849 B2 9/2011 Johnson et al.
8,200,506 B2 * 6/2012 Kil ......................... G16H 20/00 705/2
9,536,052 B2 1/2017 Amarasingham et al.
9,916,099 B2 * 3/2018 Alapati ................... G06F 3/067
10,074,059 B1 9/2018 Albro et al.
10,204,705 B2 2/2019 Lee et al.
10,332,624 B2 6/2019 Berdia
(Continued)

FOREIGN PATENT DOCUMENTS

WO 2015/077708 A1 5/2015
WO WO-2024136904 A1 * 6/2024 ............. G06N 20/20

OTHER PUBLICATIONS

Sharmam, Harsh, Counterfactual AI in Healthcare: Enhancing Decision-Making and Outcome Prediction, Apr. 11, 2025, IEEE, 2025 Seventh International Conference on CCICT, pp. 608-615. (Year: 2025).*

(Continued)

*Primary Examiner* — Dylan C White
(74) *Attorney, Agent, or Firm* — Alston & Bird LLP

(57) ABSTRACT

Various embodiments of the present disclosure provide methods, apparatus, systems, computing devices, computing entities, and/or the like for allocating resources. The method comprises receiving, by a computing device using a resource allocation machine learning framework, historical data comprising one or more causal variables corresponding to one or more actions or inactions with respect to one or more resource-requesting entities and one or more outcomes of one or more actions, identifying, by the computing device, given ones of one or more resource-requesting entity subgroups based at least in part on the one or more causal effect predictions, and performing, by the computing device, one or more prediction-based actions based at least in part on the identification of the given one or more resource-requesting entity subgroups.

20 Claims, 11 Drawing Sheets

(56) References Cited

U.S. PATENT DOCUMENTS

| | | | | |
|---|---|---|---|---|
| 10,482,385 | B2 * | 11/2019 | Narain | G16H 50/70 |
| 10,636,002 | B2 | 4/2020 | Sessoms et al. | |
| 10,667,680 | B2 | 6/2020 | Gupta et al. | |
| 10,825,167 | B2 | 11/2020 | Rapaka et al. | |
| 11,037,676 | B2 | 6/2021 | Lee et al. | |
| 11,037,685 | B2 | 6/2021 | Lefkofsky et al. | |
| 11,086,687 | B2 * | 8/2021 | Bishop | G06F 9/5083 |
| 11,094,413 | B1 | 8/2021 | Golenski et al. | |
| 11,147,459 | B2 | 10/2021 | Sobol et al. | |
| 11,250,958 | B2 | 2/2022 | Asthana et al. | |
| 11,264,128 | B2 | 3/2022 | Brown et al. | |
| 11,278,246 | B1 | 3/2022 | McNair | |
| 11,379,747 | B1 | 7/2022 | Richens et al. | |
| 11,651,291 | B2 | 5/2023 | Karanth et al. | |
| 11,687,380 | B2 * | 6/2023 | Fawcett | G06F 9/5061 718/102 |
| 11,790,268 | B1 | 10/2023 | Wick et al. | |
| 11,798,689 | B2 | 10/2023 | Hogue et al. | |
| 11,875,903 | B2 | 1/2024 | Schaeffer et al. | |
| 11,880,364 | B2 * | 1/2024 | Jiang | G06N 20/00 |
| 12,046,360 | B2 | 7/2024 | Kogan et al. | |
| 12,062,434 | B2 | 8/2024 | Day et al. | |
| 12,328,359 | B1 * | 6/2025 | Wali | H04L 67/1029 |
| 12,444,503 | B2 * | 10/2025 | McGrath | G06N 5/02 |
| 12,511,554 | B2 | 12/2025 | Nasr-Azadani et al. | |
| 2008/0147438 | A1 | 6/2008 | Kil | |
| 2008/0255910 | A1 | 10/2008 | Bagchi et al. | |
| 2010/0312581 | A1 * | 12/2010 | Wachtell | G16H 40/20 707/812 |
| 2012/0221368 | A1 | 8/2012 | Sui et al. | |
| 2013/0262357 | A1 | 10/2013 | Amarasingham et al. | |
| 2014/0136230 | A1 | 5/2014 | Berdia | |
| 2015/0254330 | A1 | 9/2015 | Chan et al. | |
| 2016/0055445 | A1 | 2/2016 | Sessoms et al. | |
| 2016/0171383 | A1 | 6/2016 | Narain et al. | |
| 2016/0253462 | A1 | 9/2016 | Zhong et al. | |
| 2016/0266816 | A1 | 9/2016 | Alapati et al. | |
| 2017/0147762 | A1 | 5/2017 | Vallee | |
| 2017/0212994 | A1 | 7/2017 | Lee et al. | |
| 2018/0102190 | A1 * | 4/2018 | Hogue | G16H 10/60 |
| 2018/0113982 | A1 | 4/2018 | Asthana et al. | |
| 2018/0160894 | A1 | 6/2018 | Gupta et al. | |
| 2018/0226150 | A1 | 8/2018 | Hayter et al. | |
| 2018/0315182 | A1 * | 11/2018 | Rapaka | G16H 50/20 |
| 2019/0108909 | A1 | 4/2019 | Lee et al. | |
| 2019/0138367 | A1 | 5/2019 | Bishop et al. | |
| 2019/0209022 | A1 | 7/2019 | Sobol et al. | |
| 2019/0267133 | A1 | 8/2019 | Schwarz et al. | |
| 2019/0371460 | A1 | 12/2019 | Gutierrez | |
| 2020/0058393 | A1 | 2/2020 | Wang et al. | |
| 2020/0210965 | A1 | 7/2020 | Garber et al. | |
| 2020/0312443 | A1 | 10/2020 | De Massari et al. | |
| 2020/0411170 | A1 * | 12/2020 | Brown | G06N 20/00 |
| 2021/0020305 | A1 | 1/2021 | Ray | |
| 2021/0110287 | A1 | 4/2021 | Perov et al. | |
| 2021/0125730 | A1 | 4/2021 | Lefkofsky et al. | |
| 2021/0200522 | A1 | 7/2021 | Bequet et al. | |
| 2021/0241179 | A1 * | 8/2021 | Karanth | G06N 20/20 |
| 2021/0319884 | A1 * | 10/2021 | Day | G16H 40/20 |
| 2022/0019914 | A1 | 1/2022 | James et al. | |
| 2022/0044826 | A1 | 2/2022 | Schaeffer et al. | |
| 2022/0075664 | A1 | 3/2022 | Fawcett et al. | |
| 2022/0130529 | A1 | 4/2022 | Al-Abbasi et al. | |
| 2022/0237192 | A1 * | 7/2022 | Jiang | G06F 16/2455 |
| 2022/0309370 | A1 | 9/2022 | Mason et al. | |
| 2022/0367051 | A1 | 11/2022 | Mcgrath et al. | |
| 2022/0405614 | A1 | 12/2022 | Nasr-Azadani et al. | |
| 2023/0005607 | A1 | 1/2023 | Kogan et al. | |
| 2023/0034198 | A1 | 2/2023 | Lublin et al. | |
| 2023/0098896 | A1 * | 3/2023 | Garapati | G06N 3/04 709/224 |
| 2023/0142594 | A1 * | 5/2023 | Eberhardt, III | G16H 50/20 705/4 |
| 2023/0207097 | A1 | 6/2023 | Mason | |
| 2024/0047042 | A1 * | 2/2024 | Daza | G16H 50/20 |
| 2024/0211779 | A1 * | 6/2024 | Conchuir | G06N 5/04 |
| 2024/0362068 | A1 * | 10/2024 | O Conchuir | G06F 9/5005 |
| 2025/0182910 | A1 * | 6/2025 | Ansari | G16H 50/70 |
| 2025/0259041 | A1 * | 8/2025 | Crabtree | G06N 3/042 |

OTHER PUBLICATIONS

Lamsaf, Asmae, Causality, Machine Learning, and Feature Selection: A Survey, Apr. 9, 2025, Sensors (Basel Switzerland), 2025-25-2373, pp. 1-25 (Year: 2025).*

Alves, Matheus Facure. "22—Debiased/Orthogonal Machine Learning", Causal Inference For The Brave and True, (Year: 2022), (20 pages), available online: https://matheusfacure.github.io/python-causality-handbook/22-Debiased-Orthogonal-Machine-Learning.html#ml-for-nuisance-parameter>.

Chernozhukov, Victor et al. "Double/Debiased Machine Learning For Treatment and Structural Parameters," Econometrics Journal, vol. 21, (Year: 2018), pp. CA-C68, DOI: 10.1111/ectj.12097.

Choi, Edward et al. "RETAIN: An Interpretable Predictive Model for Healthcare using Reverse Time Attention Mechanism", 30th Conference On Neural Information Processing Systems (NIPS 2016), vol. 29, (Year: 2016), pp. 1-9, Barcelona, Spain, available online: https://proceedings.neurips.cc/paper/2016/file/231141b34c82aa95e48810a9d1b33a79-Paper.pdf.

Hessam, Mohammad et al. "An Integrated Deep Learning and Stochastic Optimization Approach For Resource Management In Team-Based Healthcare Systems," Expert Systems with Applications. vol. 187:115924, Jan. 1, 2022, (29 pages), available online: https://www.sciencedirect.com/science/article/abs/pii/S0957417421012781.

Riverin, Bruno D. "Innovations and Opportunities For Primary Health Care After Hospital Discharge: An Application Of Causal Inference Methods In Health Services Research", Thesis, McGill University, Montreal, Quebec, Canada, (Year: 2016), (155 pages), available online: https://escholarship.mcgill.ca/concern/theses/w6634628z>.

Arias, Michael et al. "Mapping The Patient's Journey In Healthcare Through Process Mining," International Journal of Environmental Research and Public Health, vol. 17, No. 18:6586, Sep. 10, 2020, pp. 1-16, DOI: 10.3390/ijerph17186586.

Chernozhukov, Victor et al. "Double/Debiased Machine Learning for Treatment and Causal Parameters," arXiv:1608.00060v6 [stat.ML], Dec. 12, 2017, pp. 1-71, available online: https://arxiv.org/pdf/1608.00060v6.pdf.

Facure, Matheus. "22—Debiased/Orthogonal Machine Learning," Causal Inference For The Brave and True, (Year: 2022), (20 pages), available online: https://matheusfacure.github.io/python-causality-handbook/22-Debiased-Orthogonal-Machine-Learning.html#ml-for-nuisance-parameters.

Li, Yafei et al. "Optimal Scheduling In Cloud Healthcare System Using Q-Learning Algorithm," Complex & Intelligent Systems, vol. 8, Jun. 23, 2022, pp. 4603-4618, DOI: 10.1007/s40747-022-00776-9.

Liu, Dianbo et al. "Machine Learning Approaches To Predicting No-Shows In Pediatric Medical Appointment," NPJ|Digital Medicine, vol. 5, No. 50, Apr. 20, 2022, pp. 1-11, DOI: 10.1038/s41746-022-00594-w.

Ren, Dongning et al. "Nonlinear Effect of Social Interaction Quantity on Psychological Well-Being: Diminishing Returns or Inverted U?", Journal of Personality and Social Psychology: Interpersonal Relations and Group Processes, vol. 122, No. 6, Jun. 2022, pp. 1056-1074, DOI: 10.1037/pspi0000373.

Schuurmans, Megan et al. "Setting The Research Agenda For Clinical Artificial Intelligence In Pancreatic Adenocarcinoma Imaging," Cancers, vol. 14, No. 14:3498, Jul. 19, 2022, pp. 1-20, DOI: 10.3390/cancers14143498.

Huang, Yongxi et al. "Optimal Allocation Of Multiple Emergency Service Resources For Protection of Critical Transportation Infrastructure, " Transportation Research Record: Journal of the Transportation Research Board, vol. 2022, No. 1, Jan. 2007, pp. 1-8, Transportation Research Board of the National Academies, Washington D.C., DOI: 10.3141/2022-01.

(56) References Cited

OTHER PUBLICATIONS

Hynninen, Yrjänä. "Operationalization of Utilitarian and Egalitarian Objectives for Optimal Allocation," Decision Sciences, vol. 52, No. 5, Oct. 2021, pp. 1169-1208, Available Online: https://onlinelibrary.wiley.com/doi/pdfdirect/10.1111/deci.12448.
Non-Final Rejection Mailed on Apr. 28, 2026 for U.S. Appl. No. 18/086,751, 22 page(s).
Notice of Allowance and Fees Due (PTOL-85) Mailed on Feb. 24, 2026 for U.S. Appl. No. 18/327,253, 12 page(s).
Non-Final Rejection Mailed on May 26, 2026 for U.S. Appl. No. 18/307,033, 10 page(s).
Wu, Xing, et al., "Methods and Applications of Causal Reasoning in Medical Field", Proceedings of 2021 7th International Conference on Big Data and Information Analytics (BigDIA), Oct. 29-31, 2021, pp. 79-86, IEEE Xplore, Chongqing, China.

* cited by examiner

| | | | | 'Raw' Health Care Data | | | Predictive Model Scores | |
|---|---|---|---|---|---|---|---|---|
| Member ID | Intervention | Measure before intervention (BMI) | Measure before intervention (BMI) | Age | Smoker | Diagnosed CKD | Diabetes risk score | Admit risk score |
| 1 | True | 33.2 | 36.2 | 68 | True | False | 0.82 | 0.56 |
| 2 | False | 28.8 | 31.1 | 71 | False | True | 0.55 | 0.25 |
| 3 | True | 26.5 | 25.3 | 73 | False | False | 0.14 | 0.04 |
| 4 | True | 28.7 | 28.6 | 65 | False | False | 0.92 | 0.47 |

FIG. 9

| HCC138 | HCC022 | HCC019 | Number HCCs | Mean admits/1,000 prior HC | Effect of HC (reduction in admits/1,000) | Num Members |
|---|---|---|---|---|---|---|
| F | F | F | 0 | 52.5 | 7.5 | 927,014 |
| F | F | T | 1 | 75 | 15 | 253,907 |
| F | T | F | 1 | 75 | 17.5 | 68,710 |
| T | F | F | 1 | 130 | 7.5 | 88,192 |
| F | T | T | 2 | 105 | 25 | 72,820 |
| T | F | T | 2 | 207.5 | 30 | 81,373 |
| T | T | F | 2 | 187.5 | 10 | 12,170 |
| T | T | T | 3 | 307.5 | 37.5 | 32,099 |

FIG. 10

CAUSAL INFERENCE FOR OPTIMIZED RESOURCE ALLOCATION

BACKGROUND

Various embodiments of the present disclosure address technical challenges related to managing computing systems with finite resources and prioritizing resource-requesting entities for allocating resources most effectively.

BRIEF SUMMARY

In general, various embodiments of the present disclosure provide methods, apparatus, systems, computing devices, computing entities, and/or the like for identifying resource-requesting entity subgroups benefiting most from intervention and allocation of resources.

In accordance with one aspect, a method for allocating resources is provided. In one embodiment, the method comprises: receiving, by a computing device using a resource allocation machine learning framework, historical data comprising one or more causal variables corresponding to one or more actions and inactions with respect to one or more resource-requesting entities and one or more outcomes of one or more actions, wherein: the resource allocation machine learning framework comprises a predictive machine learning model and a causal inference machine learning model, the predictive machine learning model is configured to generate one or more predictive risk scores associated with one or more events based at least in part on the historical data, the causal inference machine learning model is configured to receive at least a portion of the historical data, the one or more predictive risk scores, and directed acyclic graph data comprising expert knowledge data stored on one or more databases, and generate one or more causal effect predictions on an outcome of interest from one or more actions taken on a given resource-requesting entity based at least in part on the one or more predictive risk scores, at least the portion of the historical data, and the directed acyclic graph data, wherein: training the causal inference machine learning model comprises: determining causal effect values for a population of resource-requesting entities based at least in part on the one or more predictive risk scores, at least the portion of the historical data, and the directed acyclic graph data, apportioning the population of resource-requesting entities into one or more resource-requesting entity subgroups, and ranking the resource-requesting entity subgroups by magnitude of the causal effect values, wherein the one or more causal effect predictions are based at least in part on the ranking of the resource-requesting entity subgroups; identifying, by the computing device, given ones of the one or more resource-requesting entity subgroups based at least in part on the one or more causal effect predictions; and performing, by the computing device, one or more prediction-based actions based at least in part on the identification of the given one or more resource-requesting entity subgroups.

In accordance with another aspect, an apparatus comprising at least one processor and at least one memory including computer program code is provided. In one embodiment, the at least one memory and the computer program code may be configured to, with the processor, cause the apparatus to: receive, using a resource allocation machine learning framework, historical data comprising one or more causal variables corresponding to one or more actions and inactions with respect to one or more resource-requesting entities and one or more outcomes of one or more actions, wherein: the resource allocation machine learning framework comprises a predictive machine learning model and a causal inference machine learning model, the predictive machine learning model is configured to generate one or more predictive risk scores associated with one or more events based at least in part on the historical data, the causal inference machine learning model is configured to receive at least a portion of the historical data, the one or more predictive risk scores, and directed acyclic graph data comprising expert knowledge data stored on one or more databases, and generate one or more causal effect predictions on an outcome of interest from one or more actions taken on a given resource-requesting entity based at least in part on the one or more predictive risk scores, at least the portion of the historical data, and the directed acyclic graph data, wherein: training the causal inference machine learning model comprises: determining causal effect values for a population of resource-requesting entities based at least in part on the one or more predictive risk scores, at least the portion of the historical data, and the directed acyclic graph data, apportioning the population of resource-requesting entities into one or more resource-requesting entity subgroups, and ranking the resource-requesting entity subgroups by magnitude of the causal effect values, wherein the one or more causal effect predictions are based at least in part on the ranking of the resource-requesting entity subgroups; identify given ones of the one or more resource-requesting entity subgroups based at least in part on the one or more causal effect predictions; and perform one or more prediction-based actions based at least in part on the identification of the given one or more resource-requesting entity subgroups.

In accordance with yet another aspect, a computer program product is provided. The computer program product may comprise at least one computer-readable storage medium having computer-readable program code portions stored therein, the computer-readable program code portions comprising executable portions configured to: receive, using a resource allocation machine learning framework, historical data comprising one or more causal variables corresponding to one or more actions and inactions with respect to one or more resource-requesting entities and one or more outcomes of one or more actions, wherein: the resource allocation machine learning framework comprises a predictive machine learning model and a causal inference machine learning model, the predictive machine learning model is configured to generate one or more predictive risk scores associated with one or more events based at least in part on the historical data, the causal inference machine learning model is configured to receive at least a portion of the historical data, the one or more predictive risk scores, and directed acyclic graph data comprising expert knowledge data stored on one or more databases, and generate one or more causal effect predictions on an outcome of interest from one or more actions taken on a given resource-requesting entity based at least in part on the one or more predictive risk scores, at least the portion of the historical data, and the directed acyclic graph data, wherein: training the causal inference machine learning model comprises: determining causal effect values for a population of resource-requesting entities based at least in part on the one or more predictive risk scores, at least the portion of the historical data, and the directed acyclic graph data, apportioning the population of resource-requesting entities into one or more resource-requesting entity subgroups, and ranking the resource-requesting entity subgroups by magnitude of the causal effect values, wherein the one or more causal effect predictions are based at least in part on the ranking of the resource-requesting entity subgroups; identify given ones of the one or more resource-requesting entity subgroups based at least in part on the one or more causal effect predictions; and perform one or more prediction-based actions based at least in part on the identification of the given one or more resource-requesting entity subgroups.

BRIEF DESCRIPTION OF THE DRAWINGS

Figure 1:
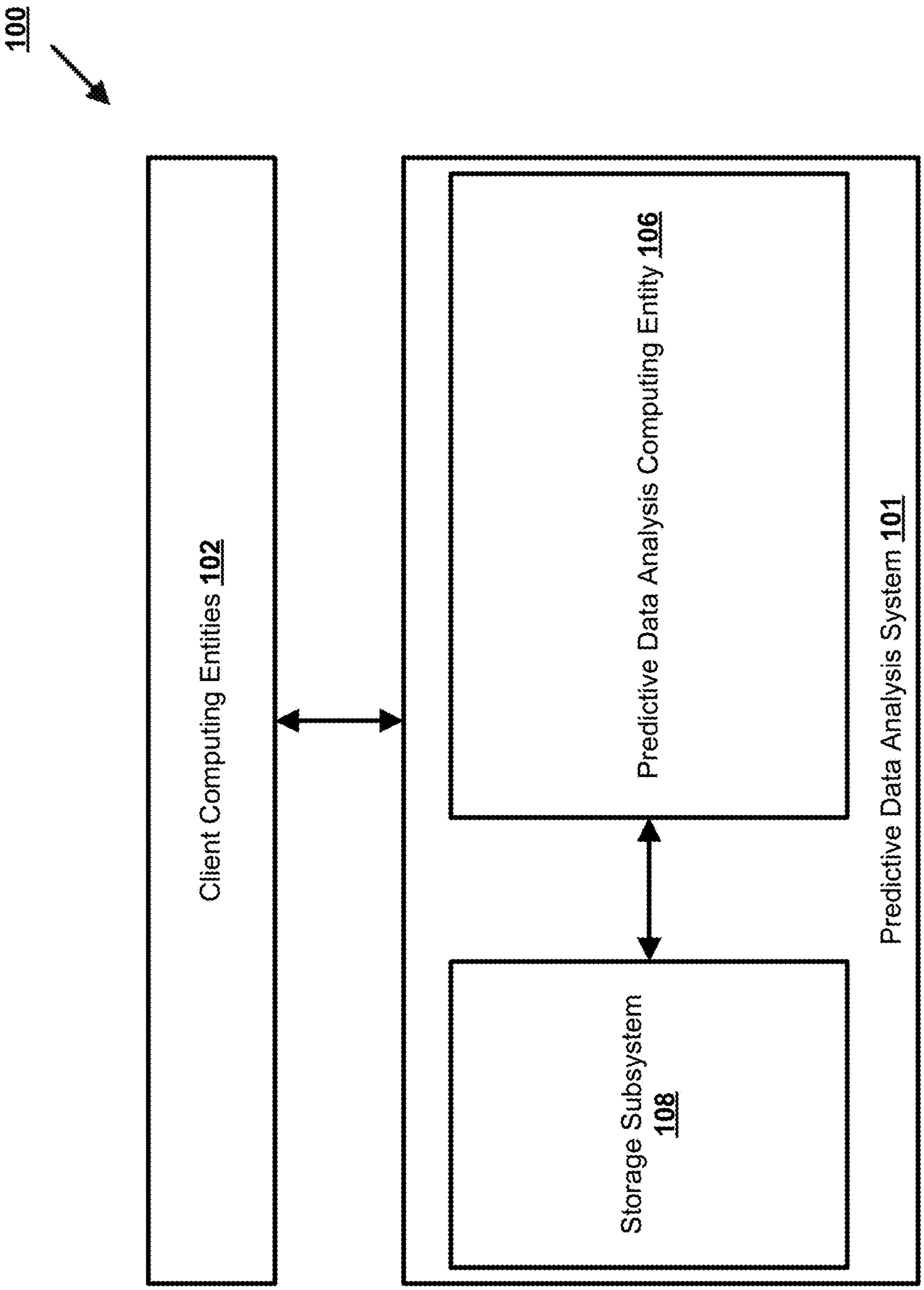

Having thus described the disclosure in general terms, reference will now be made to the accompanying drawings, which are not necessarily drawn to scale, and wherein:

FIG. 1 provides an exemplary overview of an architecture that can be used to practice embodiments of the present disclosure.

Figure 2:
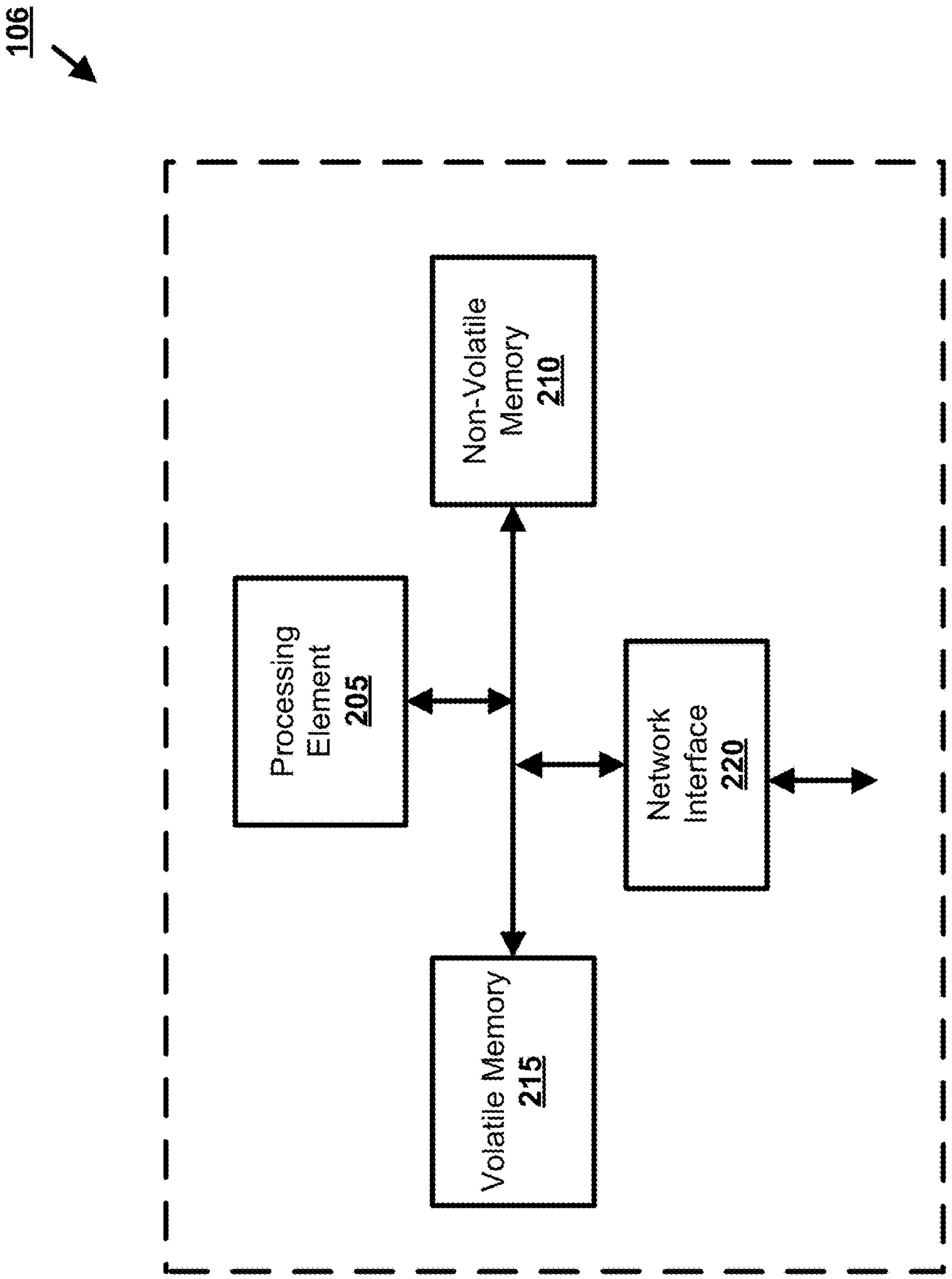

FIG. 2 provides an example predictive data analysis computing entity in accordance with some embodiments discussed herein.

Figure 3:
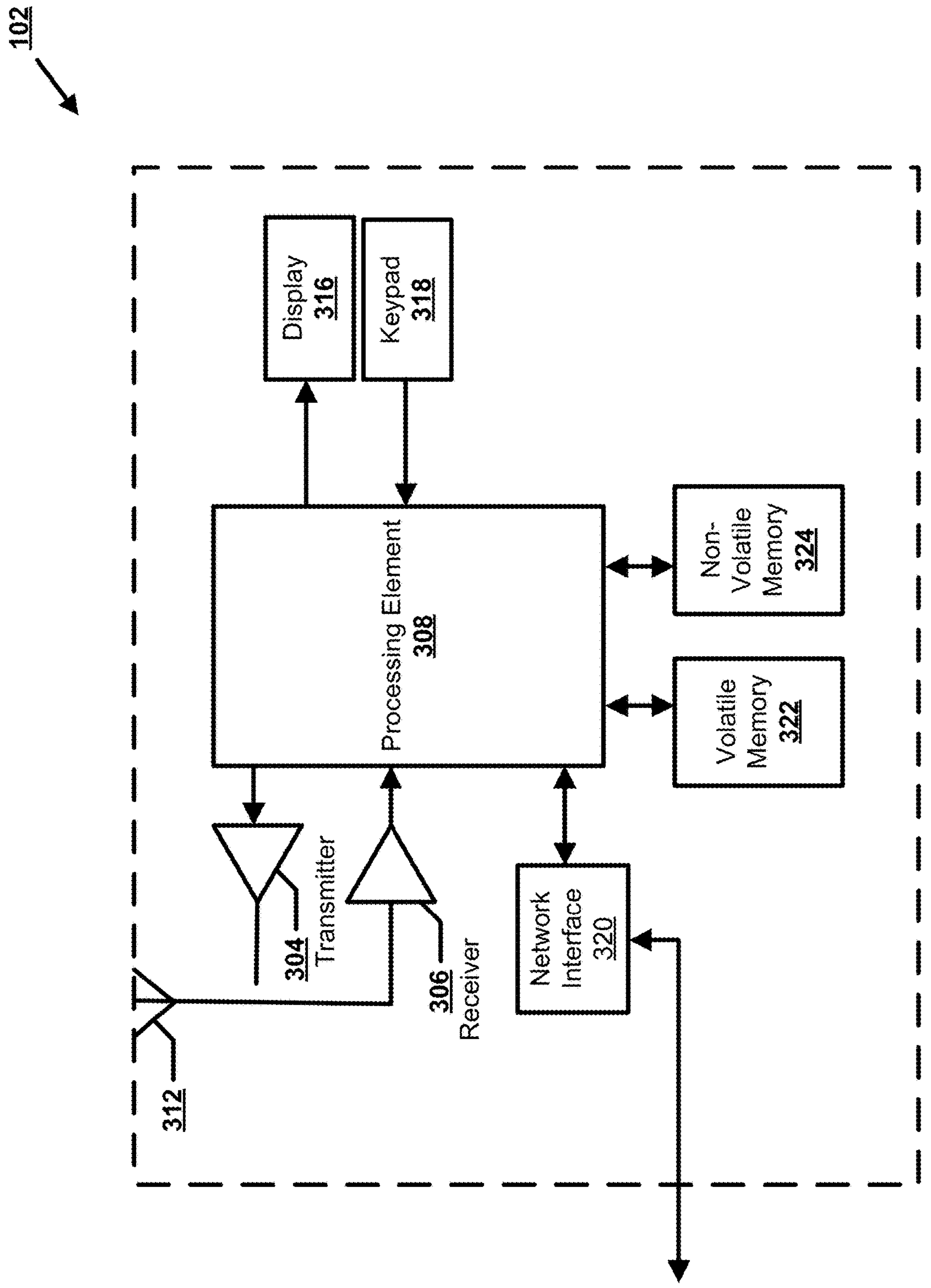

FIG. 3 provides an example client computing entity in accordance with some embodiments discussed herein.

Figure 4:
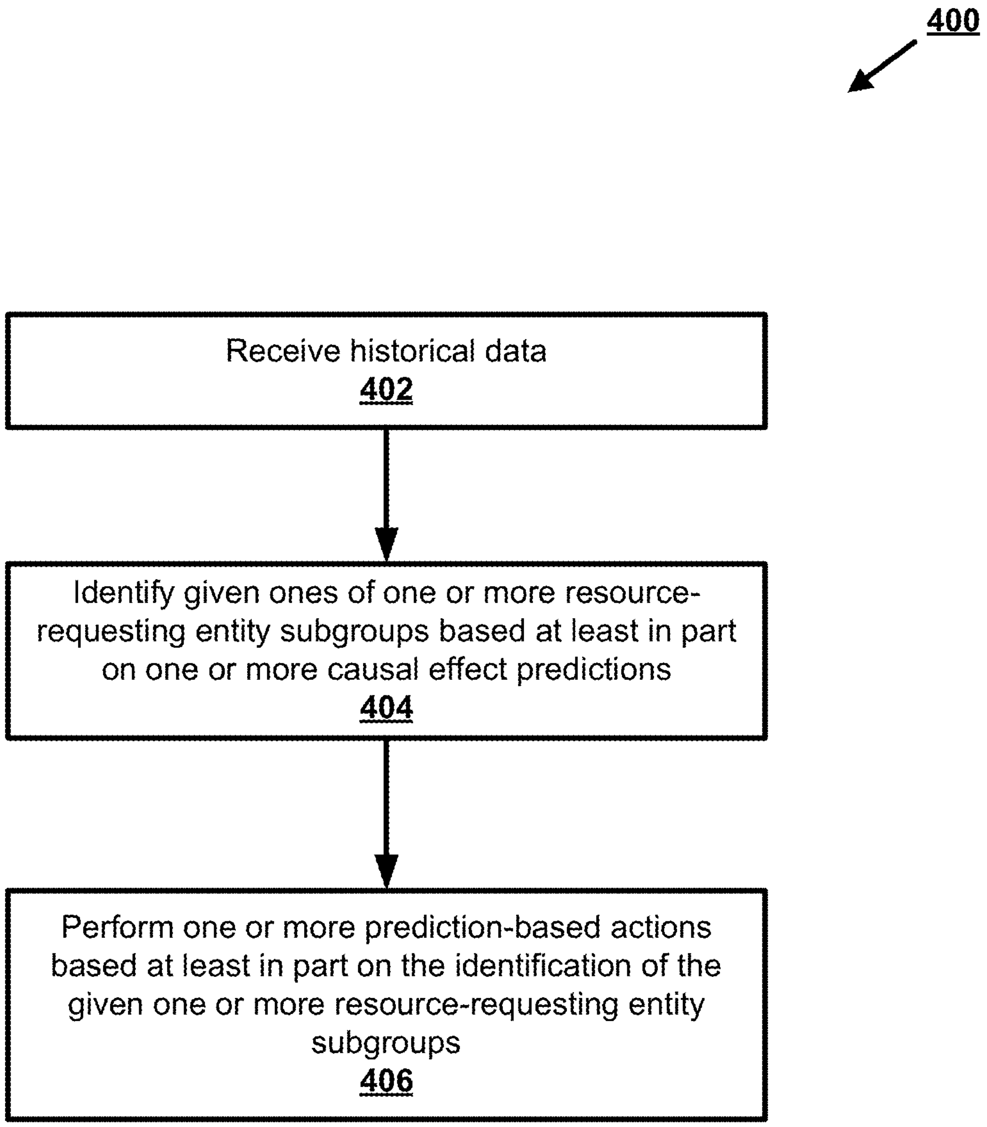

FIG. 4 is a flowchart diagram of an example process for determining how to allocate resources to resource-requesting entities in accordance with some embodiments discussed herein.

Figure 5:
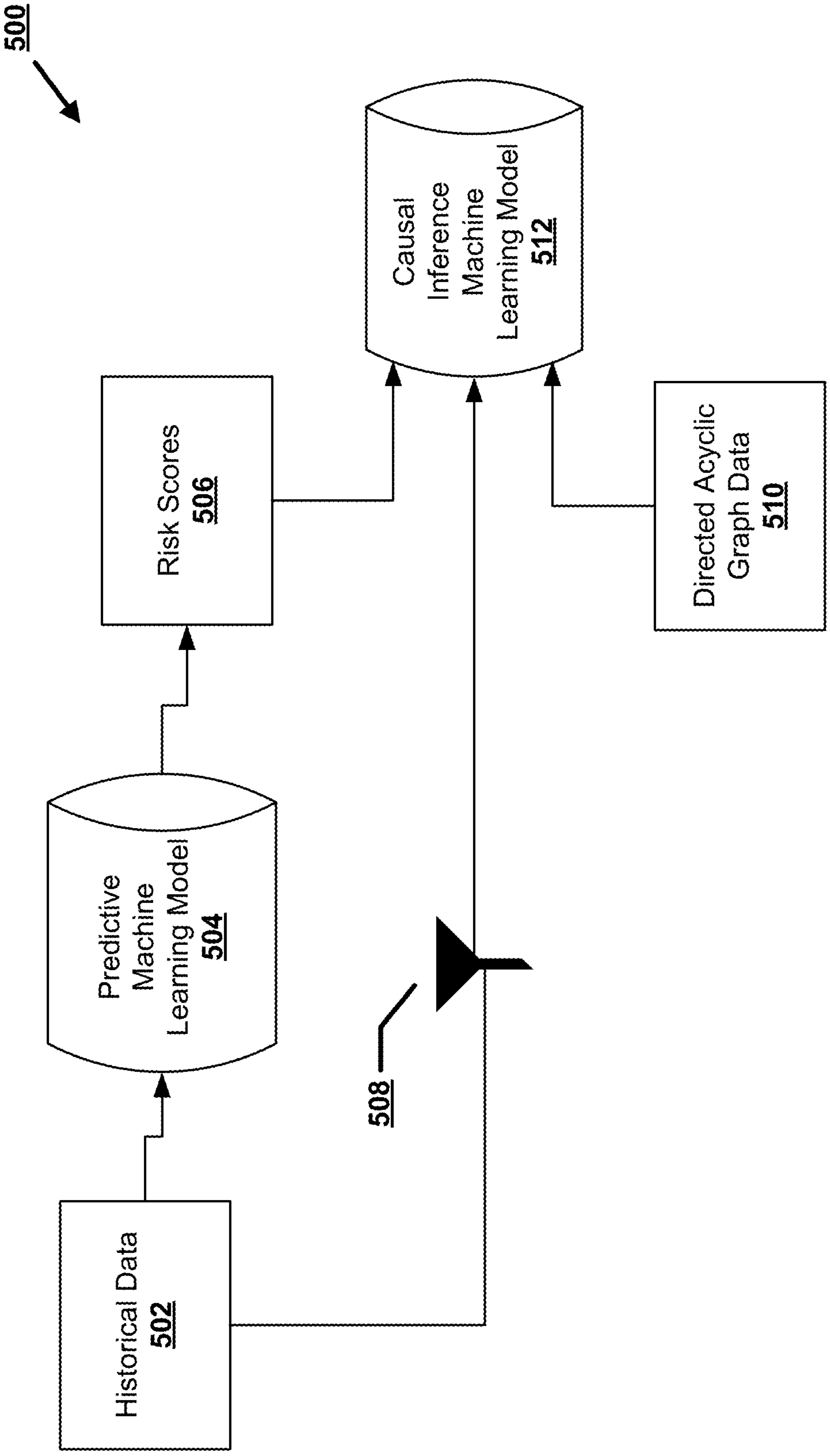

FIG. 5 presents an operational example of a resource allocation machine learning framework in accordance with some embodiments discussed herein.

Figure 6:
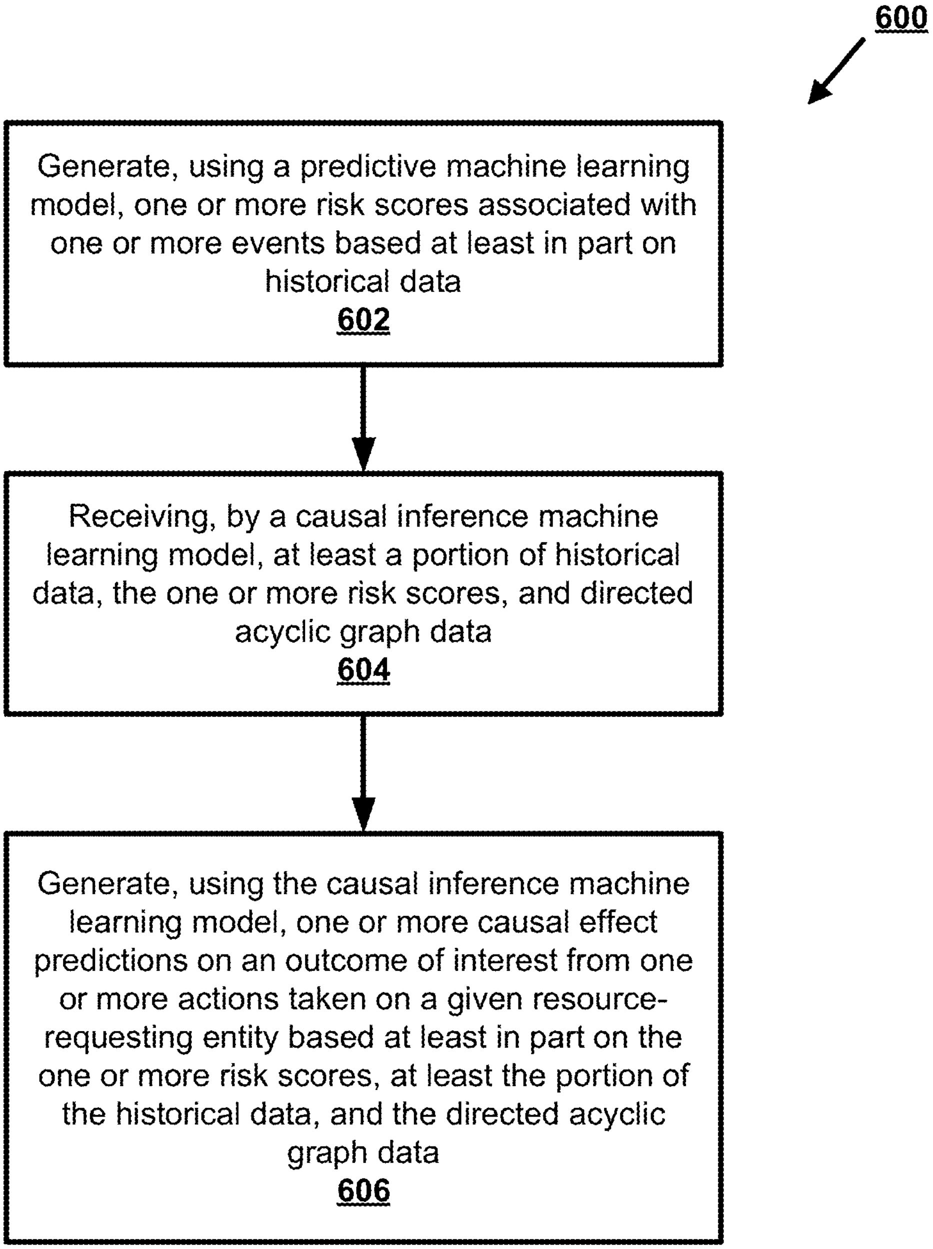

FIG. 6 is a flowchart diagram of an example process for generating one or more causal effect predictions in accordance with some embodiments discussed herein.

Figure 7:
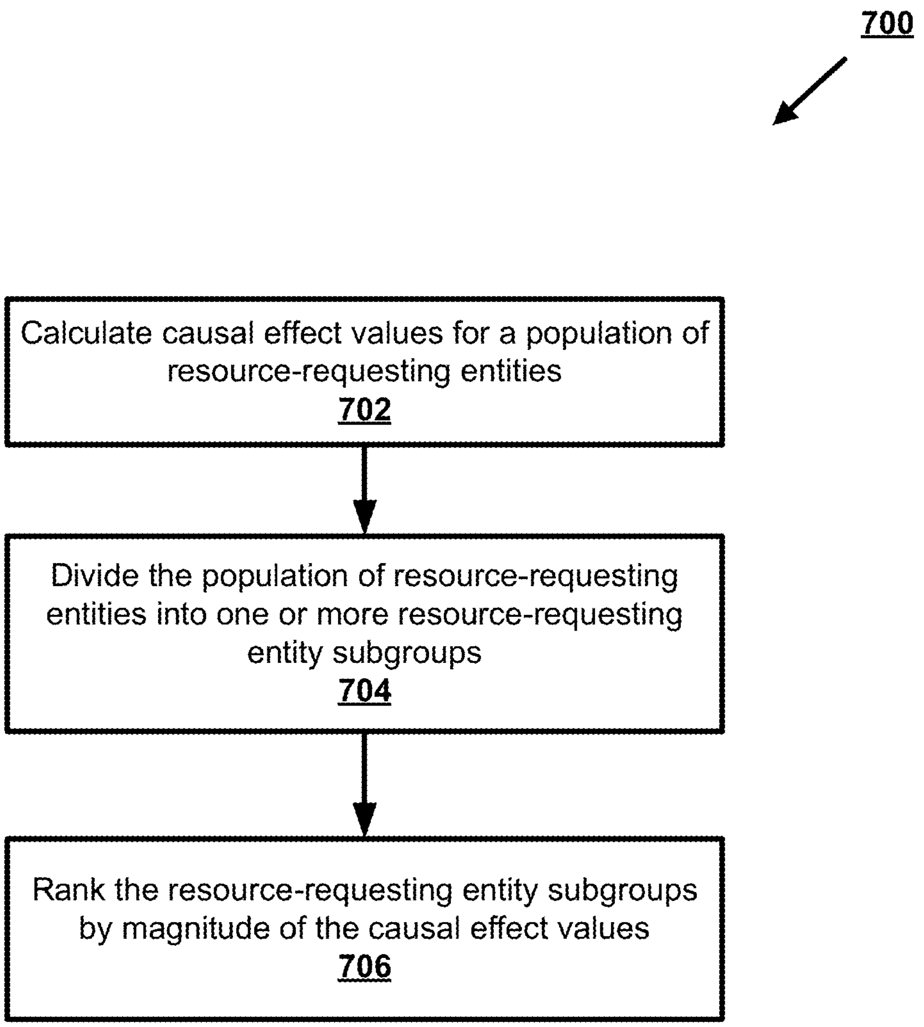

FIG. 7 is a flowchart diagram of an example process for training a causal inference machine learning model in accordance with some embodiments discussed herein.

Figure 8:
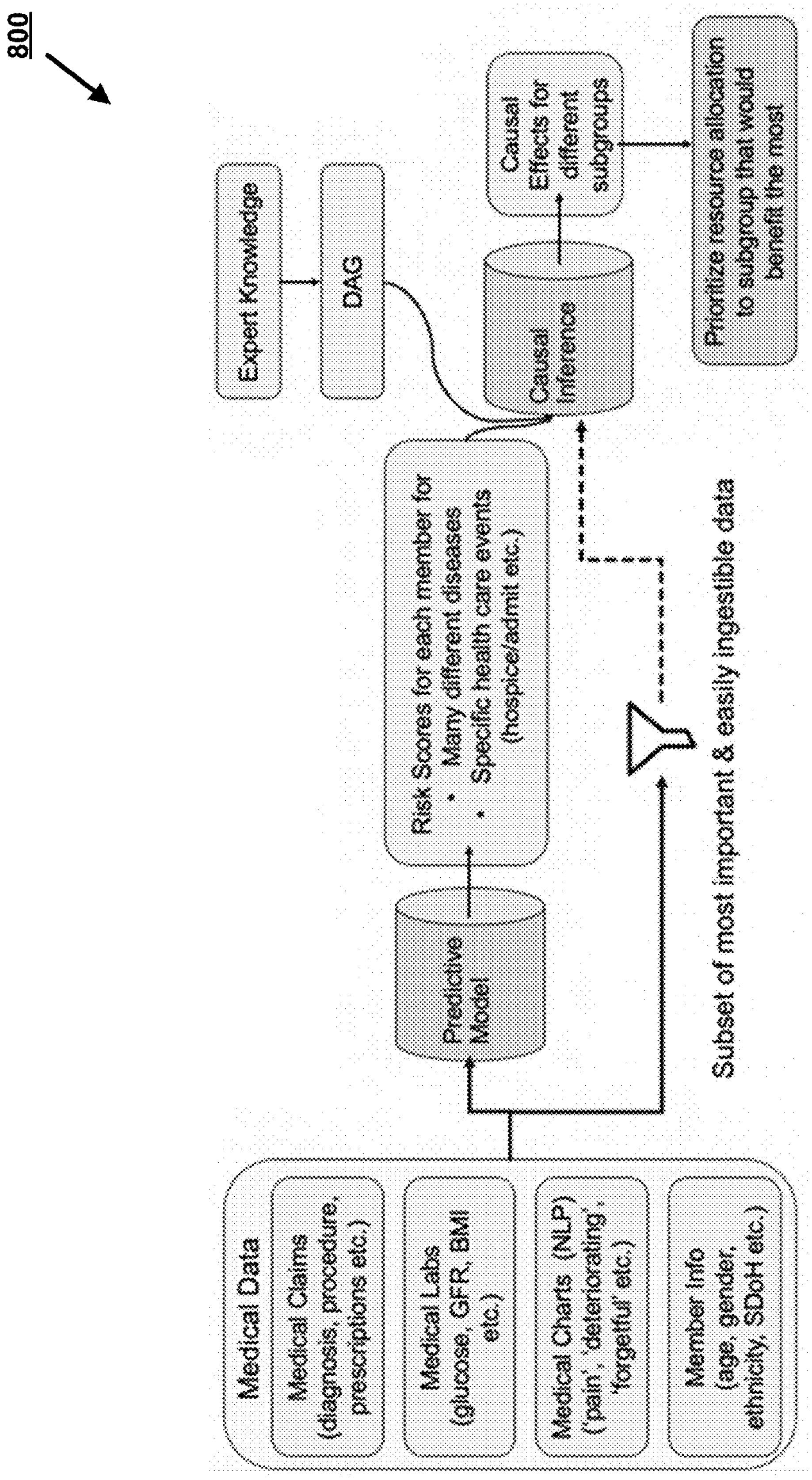

FIG. 8 presents an operational example of a resource allocation machine learning framework in accordance with some embodiments discussed herein.

FIG. 9 presents an operational example of a typical dataset used by a causal inference machine learning model to determine causal inference for optimum resource allocation in accordance with some embodiments discussed herein.

FIG. 10 presents an operational example of results from a causal inference model in accordance with some embodiments discussed herein.

Figure 11:
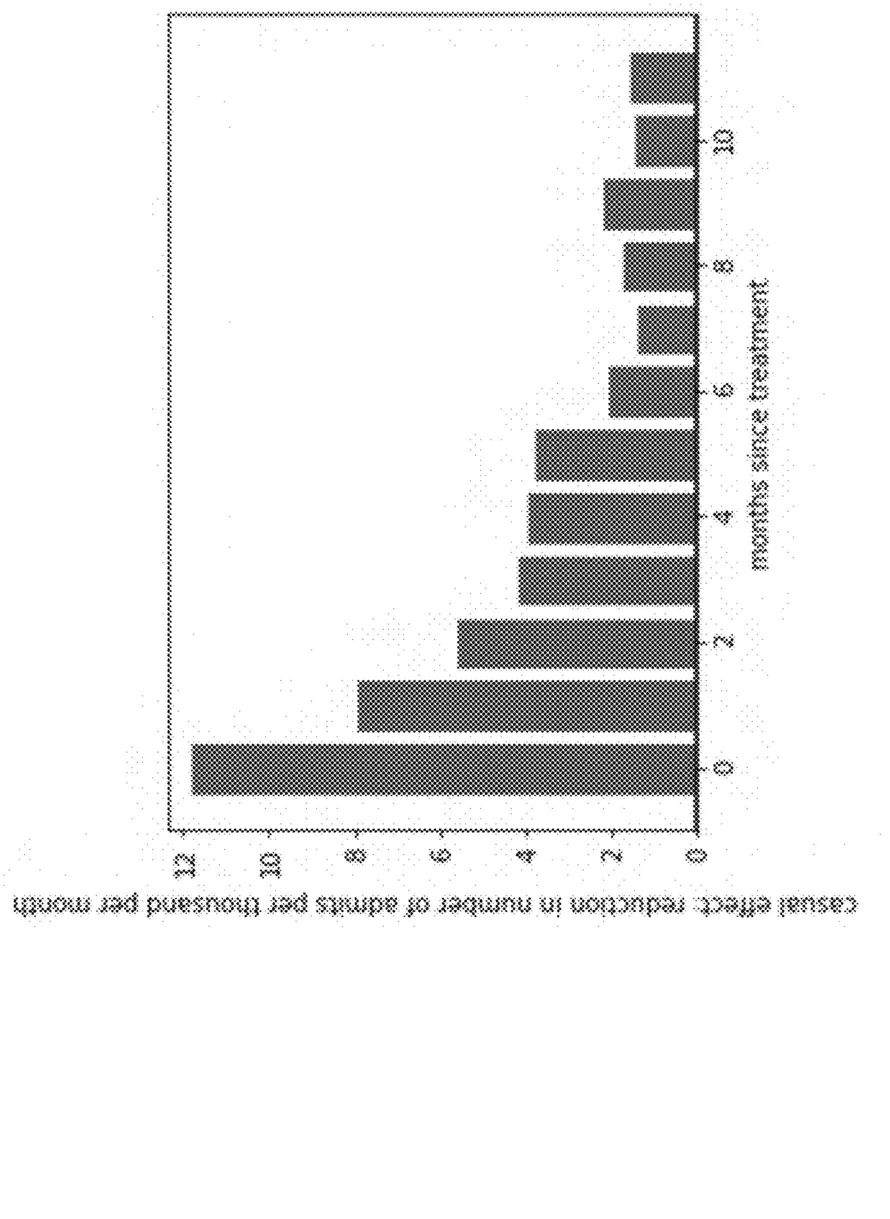

FIG. 11 presents an exemplary time decaying benefit of a resource in a healthcare setting in accordance with some embodiments discussed herein.

DETAILED DESCRIPTION

Various embodiments of the present disclosure now will be described more fully hereinafter with reference to the accompanying drawings, in which some, but not all, embodiments of the disclosures are shown. Indeed, these disclosures may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present disclosure are described with reference to predictive data analysis, one of ordinary skill in the art will recognize that the disclosed concepts can be used to perform other types of data analysis.

I. Overview and Technical Improvements

Various embodiments of the present disclosure make important technical contributions to improving allocation of limited resources. In particular, various embodiments of the present disclosure determine given ones of a plurality of resource-requesting entities benefit most from intervention, prioritize the given resource-requesting entities, and allocate resources based at least in part on the prioritized resource-requesting entities. In doing so, the techniques described herein improve performance, e.g., resource-to-benefit, outcomes of any given computing system. Accordingly, the techniques described herein improve at least one of the computational efficiency, storage-wise efficiency, and operational efficiency of computational systems.

For example, various embodiments of the present disclosure improve resource allocation by predicting causal effect of one or more actions taken on a given resource-requesting entity on an outcome of interest. As described herein, computing systems may have finite resources available to fulfill resource requests, and as such, decisions may need to be made to prioritize resource requests in order to allocate resources most effectively. To effectively distribute resources, knowledge of direct causal effect of any single intervention on an outcome of interest may be essential, and causal effect specific to a particular subgroup of resource-requesting entities may be considered to capture different requirements of different groups of resource-requesting entities.

Existing techniques may comprise predictive models based at least in part on machine learning algorithms that use historical data to identify resource-requesting entities likely to result in adverse events. However, such predictive models may comprise associative models that identify correlation, not causation. Hence, they are unable to determine what causes an adverse effect. Additionally, associative models are not able to be used to make predictions under intervention. That is, because by intervening, the data in which the model was trained on is changed and cannot be accounted for.

The above-mentioned limitations of associative models have severe implications in their application in the prioritization and allocation of resources because they can only be used to identify resource-requesting entities that require resources, but they are completely incapable of estimating the impact of intervention (e.g., resource allocation). Currently these associative models are used for prioritization of resource-requesting entities and allocation of scarce resources, under the assumption that resource-requesting entities with the greatest risk of a negative event are also the resource-requesting entities who would benefit most from intervention, but this is not always true.

However, in accordance with various embodiments of the present disclosure, a resource allocation machine learning framework may be configured to determine resource-requesting entity subgroups benefiting most from one or more actions based at least in part on a causal effect prediction. In particular, the resource allocation machine learning framework may comprise a causal inference machine learning model that is trained to predict causal effects of action taken on resource-requesting entities for an outcome of interest based at least in part on historical data, one or more predictive risk scores associated with one or more events based at least in part on the historical data, and directed acyclic graph data. As such, one or more prediction-based actions (e.g., resource allocation) may be performed based at least in part on the causal effect prediction. This technique will lead to higher success of performing predictive operations as needed for certain resource-requesting entities. In doing so, the techniques described herein improve efficiency and quality-of-service. Accordingly, the techniques described herein improve at least one of the computational efficiency, storage-wise efficiency, and operational efficiency of computational systems.

II. Definitions

The term "resource-requesting entity" may refer to a data construct that describes an object, article, file, program, service, task, operation, computing, and/or the like unit that requires one or more resources to execute an operation, perform a task, maintain or advance a state, or continue functioning. A resource-requesting entity may request a resource either upon a given condition or periodically. In some embodiments, a computing device may determine whether to allocate a resource requested by a resource-requesting entity.

The term "resource" may refer to a data construct that describes a physical or virtual component of limited availability, such as within or may be provided by a computer system. For example, connected devices and system components may be accessed as resources. Virtual resources may include files, network connections, and memory areas. Additional examples of resources may comprise computation time, a number of steps necessary to solve a problem, and memory space, such as an amount of storage needed while solving the problem. In some embodiments, a resource may also be associated with a stock or supply of money, materials, staff, and other assets that can be drawn on by a computing system.

The term "historical data" may refer to a data construct that describes a recording of structure and/or unstructured data including one or more causal variables corresponding to one or more actions and inactions with respect to one or more resource-requesting entities and one or more outcomes of the one or more actions and inactions. As an example, historical data may comprise a log of activity, events, diagnosis, statistics, actions or procedures, and any other information associated with the one or more resource-requesting entities. The historical data may be stored in a database and provided as input to a resource allocation machine learning framework for generating a causal effect prediction output.

The term "causal variable" may refer to a data construct that describes an independent variable that produces a causal effect. A causal variable may represent a predictor or causal variable used to generate a causal effect prediction. For example, a causal relationship (or a cause-and-effect relationship), may be observed by changing a causal variable, e.g., by performing an action, to cause a change in an outcome of an event.

The term "action" may refer to a data construct that describes an intervention in response to a request for one or more resources by a resource-requesting entity. The intervention may be an allocation or facilitation of one or more resources towards a resource-requesting entity.

The term "inaction" may refer to a data construct that describes non-intervention in response to a request for one or more resources by a resource-requesting entity. As an example, non-intervention may comprise deferral or lower-prioritization of allocating one or more resources towards a resource-requesting entity.

The term "event" may refer to a data construct that describes a state or condition of a resource-requesting entity that may be influenced by action or inaction taken on a request for resources by a resource-requesting entity.

The term "resource allocation machine learning framework" may refer to a data construct that describes parameters, hyperparameters, and/or defined operations of a machine learning model that is configured to process historical data to determine optimal resource allocation to resource-requesting entities. According to various embodiments of the present disclosure, the resource allocation machine learning framework may comprise a predictive machine learning model and a causal inference machine learning model. The resource allocation machine learning framework may identify given ones of one or more resource-requesting entity subgroups benefiting most from one or more actions based at least in part on one or more causal effect predictions generated by the causal inference machine learning model, and perform one or more prediction-based actions based at least in part on the identification of the given one or more resource-requesting entity subgroups.

The term "predictive machine learning model" may refer to a data construct that describes parameters, hyperparameters, and/or defined operations of a machine learning model that is configured to generate one or more predictive risk scores associated with one or more events based at least in part on historical data. According to various embodiments of the present disclosure, the one or more predictive risk scores may be used as a type of dimensionality reduction technique such that complex data that may be included in the historical data can be incorporated into a causal inference machine learning model. In some embodiments, the predictive machine learning model may comprise a reverse time attention ("RETAIN") model. The RETAIN model may attend to historical data in a reverse time order so that recent activities are likely to receive higher attention. For example, the predictive machine learning model may comprise a RETAIN model based at least in part on a two-level neural attention model that detects influential past activities and significant variables within past activities. In some embodiments, the predictive machine learning model may compute predictive risk scores for each resource-requesting entity for a range of different relevant events. The predictive risk scores may be generated using a wide range of information from historical data and a time ordering in which data in the historical data was recorded affects the resulting predictive risk scores. Predictive risk scores generated by the predictive machine learning model may be used as input data to a causal inference machine learning model.

The term "directed acyclic graph data" may refer to a data construct that describes expert knowledge data comprising one or more relationships between various causal variables, actions, and events. Directed acyclic graph data may comprise a directed acyclic graph data object that is representative of a causal diagram including assumptions, for example, about how an event being modeled works. In some embodiments, directed acyclic graph data may be stored on one or more databases and retrieved as input to a causal inference machine learning model to impart expert knowledge about relationships between different data points. As an example, directed acyclic graph data may include directionality of how variable 'X' causes variable 'Y' (and not vice versa), of how variable 'Z' depends on variable 'X' but not on variable 'Y,' of how variable 'W' causes variables 'Z' and 'Y' but not variable 'X.'

The term "causal effect prediction" may refer to a data construct that describes a prediction on an effect on a given event (e.g., that is an outcome of interest) due to action or inaction on a causal variable based at least in part on based at least in part on historical data, one or more predictive risk scores, and directed acyclic graph data.

The term "causal inference machine learning model" may refer to a data construct that describes parameters, hyper-parameters, and/or defined operations of a machine learning model that is configured to generate one or more causal effect predictions on an outcome of interest from one or more actions taken on a given resource-requesting entity based at least in part on one or more predictive risk scores generated by a predictive machine learning model, historical data, and directed acyclic graph data. According to various embodiments of the present disclosure, training the causal inference machine learning model may comprise determining causal effect values for a population of resource-requesting entities based at least in part on the one or more predictive risk scores, at least the portion of the historical data, and the directed acyclic graph data, apportioning the population of resource-requesting entities into one or more resource-requesting entity subgroups, and ranking the resource-requesting entity subgroups by magnitude of the causal effect values. The one or more causal effect predictions may be based at least in part on the ranking of the resource-requesting entity subgroups. As such, the ranking may be used to prioritize the resource-requesting entity subgroups and determine how resources should be allocated based at least in part on the ranking.

III. Computer Program Products, Methods, and Computing Entities

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid-state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Architecture

FIG. 1 is a schematic diagram of an example architecture 100 for performing predictive data analysis. The architecture 100 includes a predictive data analysis system 101 configured to receive predictive data analysis requests from client computing entities 102, process the predictive data analysis requests to generate predictions, provide the generated predictions to the client computing entities 102, and automatically perform prediction-based actions based at least in part on the generated predictions.

An example of a prediction-based action that can be performed using the predictive data analysis system 101 is a request for allocating one or more resources. For example, in accordance with various embodiments of the present disclosure, a resource allocation machine learning framework may be configured to determine resource-requesting entity subgroups benefiting most from one or more actions based at least in part on a causal effect prediction. In particular, the resource allocation machine learning framework may comprise a causal inference machine learning model that is trained to predict causal effects of action taken on resource-requesting entities for an outcome of interest based at least in part on historical data, one or more predictive risk scores associated with one or more events based at least in part on the historical data, and directed acyclic graph data. As such, one or more prediction-based actions (e.g., resource allocation) may be performed based at least in part on the causal effect prediction. This technique will lead to higher success of performing predictive operations as needed for certain resource-requesting entities. In doing so, the techniques described herein improve efficiency and quality-of-service. Accordingly, the techniques described herein improve at least one of the computational efficiency, storage-wise efficiency, and operational efficiency of computational systems.

In some embodiments, predictive data analysis system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to receive predictive data analysis requests from one or more client computing entities 102, process the predictive data analysis requests to generate predictions corresponding to the predictive data analysis requests, provide the generated predictions to the client computing entities 102, and automatically perform prediction-based actions based at least in part on the generated predictions.

The storage subsystem 108 may be configured to store input data used by the predictive data analysis computing entity 106 to perform predictive data analysis as well as model definition data used by the predictive data analysis computing entity 106 to perform various predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

A. Exemplary Predictive Data Analysis Computing Entity

FIG. 2 provides a schematic of a predictive data analysis computing entity 106 according to one embodiment of the present disclosure. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include, or be in communication with, one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the predictive data analysis computing entity 106 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity—relationship model, object model, document model, semantic model, graph model, and/or the like.

In one embodiment, the predictive data analysis computing entity 106 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include, or be in communication with, one or more input elements, such as a keyboard input, a mouse input, a touch screen/display input, motion input, movement input, audio input, pointing device input, joystick input, keypad input, and/or the like. The predictive data analysis computing entity 106 may also include, or be in communication with, one or more output elements (not shown), such as audio output, video output, screen/display output, motion output, movement output, and/or the like.

B. Exemplary Client Computing Entity

FIG. 3 provides an illustrative schematic representative of a client computing entity 102 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 can be operated by various parties. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the predictive data analysis computing entity 106. In a particular embodiment, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the predictive data analysis computing entity 106 via a network interface 320.

Via these communication standards and protocols, the client computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the predictive data analysis computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the predictive data analysis computing entity 106 and/or various other computing entities.

In another embodiment, the client computing entity 102 may include one or more components or functionality that are the same or similar to those of the predictive data analysis computing entity 106, as described in greater detail above. As will be recognized, these architectures and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. Exemplary System Operations

As described below, various embodiments of the present disclosure make important technical contributions to improving allocation of limited resources. In particular, various embodiments of the present disclosure determine given ones of a plurality of resource-requesting entities benefit most from intervention, prioritize the given resource-requesting entities, and allocate resources based at least in part on the prioritized resource-requesting entities. In doing so, the techniques described herein improve performance, e.g., resource-to-benefit, outcomes of any given computing system. Accordingly, the techniques described herein improve at least one of the computational efficiency, storage-wise efficiency, and speed of computational systems.

FIG. 4 is a flowchart diagram of an example process 400 for determining how to allocate resources to resource-requesting entities.

In some embodiments, a resource-requesting entity describes an object, article, file, program, service, task, operation, computing unit, and/or the like that requires one or more resources to execute an operation, perform a task, maintain or advance a state, or continue functioning. A resource-requesting entity may request a resource either upon a given condition or periodically. In some embodiments, a computing device may determine whether to allocate a resource requested by a resource-requesting entity.

In some embodiments, a resource describes a physical or virtual component of limited availability, such as provided within a system or may be provided by a system. For example, connected devices and system components may be accessed as resources. Virtual resources may include files, network connections, and memory areas. Additional examples of resources may comprise computation time, a number of steps necessary to solve a problem, and memory space, such as an amount of storage needed while solving the problem. In some embodiments, a resource may also be associated with a stock or supply of money, materials, staff, and other assets that can be drawn on by a computing system.

Via the various steps/operations of the process 400, the predictive data analysis computing entity 106 can use a resource allocation machine learning framework to predict event outcomes for determining the most efficient usage of available resources.

The process 400 begins at step/operation 402 when the predictive data analysis computing entity 106 receives historical data using the resource allocation machine learning framework. In some embodiments, historical data describes a recording of structure and/or unstructured data including one or more causal variables corresponding to one or more actions and inactions with respect to one or more resource-requesting entities and one or more outcomes of the one or more actions and inactions. As an example, historical data may comprise a log of activity, events, diagnosis, statistics, actions or procedures, and any other information associated with the one or more resource-requesting entities. The historical data may be stored in a database and provided as input to a resource allocation machine learning framework for generating a causal effect prediction output.

In some embodiments, a causal variable describes an independent variable that produces a causal effect. A causal variable may represent a predictor or causal variable used to generate a causal effect prediction. For example, a causal relationship (or a cause-and-effect relationship), may be observed by changing a causal variable, e.g., by performing an action, to cause a change in an outcome of an event. In certain embodiments, such as in a healthcare setting, an example of a causal variable may comprise a treatment (e.g., a drug or procedure) of a condition which affects a specific healthcare outcome.

In some embodiments, action describes an intervention in response to a request for one or more resources by a resource-requesting entity. The intervention may be an allocation or facilitation of one or more resources towards a resource-requesting entity. In certain embodiments, such as in a healthcare setting, an example of an action may comprise a treatment to a condition.

In some embodiments, inaction describes non-intervention in response to a request for one or more resources by a resource-requesting entity. As an example, non-intervention may comprise deferral or lower-prioritization of allocating one or more resources towards a resource-requesting entity. In certain embodiments, such as in a healthcare setting, an example of inaction may comprise non-treatment of a condition.

In some embodiments, the resource allocation machine learning framework may be configured to process historical data to determine optimal resource allocation to resource-requesting entities. According to various embodiments of the present disclosure, the resource allocation machine learning framework may comprise a predictive machine learning model and a causal inference machine learning model.

An operational example of a resource allocation machine learning framework 500 is depicted in FIG. 5. As depicted in FIG. 5, in some embodiments, historical data 502 received by resource allocation machine learning framework 500 is provided to a predictive machine learning model 504. In some embodiments, an event describes a state or condition of a resource-requesting entity that may be influenced by action or inaction taken on a request for resources by a resource-requesting entity. As such, in some embodiments, a predictive machine learning model 504 may comprise parameters, hyperparameters, and/or defined operations of a machine learning model that is configured to generate one or more predictive risk scores 506 associated with one or more events based at least in part on historical data 502.

According to various embodiments of the present disclosure, the one or more predictive risk scores 506 may be used as a type of dimensionality reduction technique such that complex data that may be included in the historical data 502 can be incorporated into a causal inference machine learning model 512. In some embodiments, the predictive machine learning model 504 may comprise a reverse time attention ("RETAIN") model. The RETAIN model may attend to historical data 502 in a reverse time order so that recent activities are likely to receive higher attention. For example, the predictive machine learning model 504 may comprise a RETAIN model based at least in part on a two-level neural attention model that detects influential past activities and significant variables within past activities. In some embodiments, the predictive machine learning model 504 may compute predictive risk scores 506 for each resource-requesting entity for a range of different relevant events. The predictive risk scores 506 may be generated using a wide range of information from historical data 502 and a time ordering in which data in the historical data 502 was recorded affects the resulting predictive risk scores 506. Predictive risk scores 506 generated by the predictive machine learning model 504 may be used as input data to a causal inference machine learning model 512 along with filtered historical data 508 and directed acyclic graph data 510. Filtered historical data 508 may comprise a subset of most important and easily ingestible data from historical data 502.

In some embodiments, directed acyclic graph data 510 describes expert knowledge data comprising one or more relationships between various causal variables, actions, and events. Directed acyclic graph data 510 may comprise one or more directed acyclic graph data objects that are representative of causal diagrams including assumptions, for example, about how an event being modeled works. In some embodiments, directed acyclic graph data 510 may be stored via one or more databases and retrieved as input to causal inference machine learning model 512 to impart expert knowledge about relationships between different data points. As an example, directed acyclic graph data may include directionality of how variable 'X' causes variable 'Y' (and not vice versa), of how variable 'Z' depends on variable 'X' but not on variable 'Y,' of how variable 'W' causes variables 'Z' and 'Y' but not variable 'X.'

In some embodiments, a causal effect prediction describes a prediction on an effect on a given event (e.g., that is an outcome of interest) due to action or inaction on a causal variable based at least in part on historical data, one or more predictive risk scores, and directed acyclic graph data.

In some embodiments, causal inference machine learning model 512 may be configured to generate one or more causal effect predictions on an outcome of interest from one or more actions taken on a given resource-requesting entity based at least in part on predictive risk scores 506, filtered historical data 508, and directed acyclic graph data 510. According to various embodiments of the present disclosure, training the causal inference machine learning model 512 may comprise determining causal effect values for a population of resource-requesting entities based at least in part on predictive risk scores 506, filtered historical data 508, and directed acyclic graph data 510, apportioning the population of resource-requesting entities into one or more resource-requesting entity subgroups, and ranking the resource-requesting entity subgroups by magnitude of the causal effect values. The one or more causal effect predictions may be based at least in part on the ranking of the resource-requesting entity subgroups. As such, the ranking may be used to prioritize the resource-requesting entity subgroups and determine how resources should be allocated based at least in part on the ranking.

However, as described herein, in accordance with various embodiments of the present disclosure, a resource allocation machine learning framework may be configured to determine resource-requesting entity subgroups benefiting most from one or more actions based at least in part on a causal effect prediction. In particular, the resource allocation machine learning framework may comprise a causal inference machine learning model that is trained to predict causal effects of action taken on resource-requesting entities for an outcome of interest based at least in part on historical data, one or more predictive risk scores associated with one or more events based at least in part on the historical data, and directed acyclic graph data. As such, one or more prediction-based actions (e.g., resource allocation) may be performed based at least in part on the causal effect prediction. This technique will lead to higher success of performing predictive operations as needed for certain resource-requesting entities. In doing so, the techniques described herein improve efficiency and quality-of-service. Accordingly, the techniques described herein improve at least one of the computational efficiency, storage-wise efficiency, and operational efficiency of computational systems.

Returning to FIG. 4, at step/operation 404, the predictive data analysis computing entity 106 identifies given ones of one or more resource-requesting entity subgroups based at least in part on one or more causal effect predictions. Accordingly, in some embodiments, via performing step/operation 404, the predictive data analysis computing entity 106 prioritizes the given one or more resource-requesting entity subgroups that would benefit most from one or more actions.

At step/operation 406, the predictive data analysis computing entity 106 performs one or more prediction-based actions based at least in part on the identification of the given one or more resource-requesting entity subgroups. In some embodiments, performing the one or more prediction-based actions based at least in part on the identification of the given one or more resource-requesting entity subgroups includes allocating resources to the given one or more resource-requesting entity subgroups. As such, resources may be allocated as a result of determining causal effect in the resource-requesting entity subgroups. For example, resources may be allocated to a resource-requesting entity subgroup identified as benefiting the most from the resources.

According to other embodiments, performing the one or more prediction-based actions based at least in part on the identification of the given one or more resource-requesting entity subgroups includes determining how many resources (e.g., in terms of either quantity or frequency) should be allocated for different resource-requesting entity subgroups. In some cases, a best practice for resource allocation quantity may be known according to specifications or industry standards. But in other cases, it may be unclear how much resource should be allocated to certain resource-requesting entity subgroups, and resource requirements may vary by resource-requesting entity subgroup. By utilizing causal inference, a decay time may also be determined for a causal effect of an action in different resource-requesting entity subgroups. Hence, different actions and amount of resources can be assigned to different resource-requesting entity subgroup to optimize benefit of scare resources.

In some embodiments, performing the one or more prediction-based actions based at least in part on the identification of the given one or more resource-requesting entity subgroups may further include displaying the one or more resource-requesting entity subgroups for resource allocation using a prediction output user interface, such as a resource allocation dashboard. As an example, a prediction output user interface may display a list of top resource-requesting entity subgroups for resource allocation.

FIG. 6 is a flowchart diagram of an example process 600 for generating one or more causal effect predictions. Via the various steps/operations of the process 600, the predictive data analysis computing entity 106 can employ a predictive machine learning model and causal inference machine learning model for determining causal effect on outcomes from actions taken with respect to a given resource-requesting entity.

The process 600 begins at step/operation 602 when the predictive data analysis computing entity 106 generates, using a predictive machine learning model, one or more predictive risk scores associated with one or more events based at least in part on historical data. According to various embodiments of the present disclosure, the one or more predictive risk scores may be representative of a dimensionality reduction of the historical data such that the historical data may be incorporated into a causal inference machine learning model. As discussed above, the predictive machine learning model may comprise a RETAIN model that treats recent data in historical data 502 with greater weight in generating predictive risk scores.

At step/operation 604, the predictive data analysis computing entity 106 receives, using a causal inference machine learning model, at least a portion of the historical data, the one or more predictive risk scores generated by the predictive machine learning model, and directed acyclic graph data comprising expert knowledge data stored on one or more databases. The portion of the historical data may comprise a subset of most important and easily ingestible data from the historical data, e.g., filtered historical data. The directed acyclic graph data may comprise expert knowledge data comprising one or more relationships between various causal variables, actions, and events. In some embodiments, the directed acyclic graph data may be used to define how causal variables, actions, and events are modeled within a system. The directed acyclic graph data may be used to decide which causal variables should be controlled and determine whether causal effect is identifiable based at least in part on given data and assumptions about how a system works.

At step/operation 606, the predictive data analysis computing entity 106 generates, using the causal inference machine learning model, one or more causal effect predictions on an outcome of interest from one or more actions taken on a given resource-requesting entity based at least in part on the one or more predictive risk scores, at least the portion of the historical data, and the directed acyclic graph data. According to various embodiments of the present disclosure, the one or more causal effect predictions may comprise an estimate of an effect of action on an event outcome for a population of resource-requesting entities. The estimate may comprise a numerical causal effect value representative of an effect of action on an event outcome for the population of resource-requesting entities. As such, given resource-requesting entity subgroups may be identified as benefiting most from action and prioritize the given resource-requesting entity subgroups for which resources may be allocated to.

FIG. 7 is a flowchart diagram of an example process 700 for training a causal inference machine learning model. Via the various steps/operations of the process 700, the predictive data analysis computing entity 106 can employ a causal inference machine learning model to learn causal effect on outcomes from actions taken with respect to a given resource-requesting entity.

The process 700 begins at step/operation 702 when the predictive data analysis computing entity 106 determines causal effect values for a population of resource-requesting entities. The population of resource-requesting entities comprise member data objects associated with a need for one or more resources through one or more actions. According to various embodiments of the present disclosure, the causal effect values may be computed based at least in part on predictive risk scores generated by a predictive machine learning model, at least a portion of historical data, and directed acyclic graph data. The causal effect values may be representative of an effect of action on an event outcome for a population of resource-requesting entities. The causal inference machine learning model may comprise one or more causal inference types for determining the causal effect values including backdoor linear regression, propensity scoring and matching, and instrumental variable analysis. In some embodiments, the one or more causal inference types of the causal inference machine learning model may be determined based at least in part on the directed acyclic graph data.

At step/operation 704, the predictive data analysis computing entity 106 apportions the population of resource-requesting entities into one or more resource-requesting entity subgroups. By apportioning the population of resource-requesting entities into a number of different subgroups, the predictive data analysis computing entity 106 is able to compute the causal effect for each subgroup. The population of resource-requesting entities may be stratified according to various characteristics, such as type, current status or state, and age, to name a few.

At step/operation 706, the predictive data analysis computing entity 106 ranks the resource-requesting entity subgroups by magnitude of the causal effect values. The ranking of the resource-requesting entity subgroups may be used to generate one or more causal effect predictions by the causal inference machine learning model. The ranking may be used to identify which groups of resource-requesting entities would benefit most from action, namely a resource allocation. Hence, predictive data analysis computing entity 106 may prioritize the allocation of resources to those groups that are most in need.

According to various embodiments of the present disclosure, resource allocation machine learning framework may be applied to various systems and industries where resources may be limited, such as in financial resources, inventory, human skills, production resources, or information technology and natural resources.

An operational example of a resource allocation machine learning framework 800 is depicted in FIG. 8. As depicted in FIG. 8, in some embodiments, resource allocation machine learning framework 800 may be used in a healthcare setting. The resource allocation machine learning framework may be configured to create a causal inference model to identify a causal effect of treatments (i.e., action) on outcomes based at least in part on raw healthcare data, predictive modeling, and directed acyclic graphs wherein: (i) the raw healthcare data comprises historic health care data on members including presence/non-presence of causal variables and corresponding effects over time, (ii) predictive risk scores are computed for each member for a range of different relevant diseases based at least in part on the predictive modeling, and (iii) the directed acyclic graphs comprise expert knowledge causal diagrams including directional relationships between data points associated with a causal effect of a treatment on an outcome being identified.

Referring to FIG. 8, medical data comprising medical claims, medical labs, medical charts, and member information is received by resource allocation machine learning framework 800 and provided to a predictive machine learning model. The predictive machine learning model is configured to generate predictive risk scores for each member for different diseases and specific health care events based at least in part on the medical data.

Predictive risk scores generated by the predictive machine learning model may be used as input data to a causal inference machine learning model along with filtered historical data (a subset of most important and easily ingestible data) and directed acyclic graph data. Typically, in modern health care organizations the volume and variety of collected health care data is too great to be incorporated into standard causal inference models. As such, convention causal inference approaches are often restricted such that only a fraction of collected health care data is utilized, and the time ordering of this data is often discarded (i.e., the diagnosis of a disease may be used, but the fact that the disease was diagnosed in April and not December may not be utilized due to the added complexity). For example, the predictive machine learning model may incorporate a time sequence in which events happened (e.g., RETAIN model), lab values which may only be present for some members (handles problem of missing data), and complex data types (via natural language processing of chart terms, lab values, social determinants of health, engagement data, to name a few.

An operational example of a typical dataset used by a causal inference machine learning model to determine causal inference for optimum resource allocation is depicted in FIG. 9. As depicted in FIG. 9, in some embodiments, "raw" health care data and predictive model scores based at least in part on the raw health care data may be created using associative models with access to a large amount of complex health care data.

Returning to FIG. 8, in some embodiments, the causal inference machine learning model may be configured to generate one or more causal effect predictions for different subgroups based at least in part on magnitude of the causal effect values. A population may be apportioned into subgroups by any set/combination of characteristics (e.g., age/sex/disease status/predictive risk score). The disclosed causal inference machine learning model may be used to generate insights, such as a resource having the highest impact in for example, women over the age of 45 who are ex-smokers with chronic kidney disease.

According to various embodiments of the present disclosure, the causal inference machine learning model may compute the causal effect of an entire population (e.g., finding the expected effect of a drug on a specific healthcare outcome such as emergency room admit rates), or compute the causal effect in a subgroup of the population (e.g., finding the expected effect of a drug reducing emergency room admissions in a population of women, above the age of 45, who have diabetes and do not smoke). Hence, by apportioning a population into a number of different subgroups, the causal effect for each subgroup may be determined, and by ranking these subgroups by the magnitude of the causal effect, groups of people who would benefit most from treatment resource may be identified. Hence, the allocation of treatment to those groups who are most in need can be prioritized by a computing device, such as predictive data analysis computing entity 106, using a resource allocation machine learning framework.

An operational example of results from a causal inference model is depicted in FIG. 10. As depicted in FIG. 10, example of results from a causal inference model indicate that a scare resource should be allocated to members with a higher number of hierarchical condition categories (HCCs), or to members with specific combinations of HCCs, which have the highest causal effect (reduction in admits/1,000 members). In this case, members who have diagnosis for HCC19, HCC22 and HCC138 may be prioritized as they obtain the greatest benefit from this treatment.

In a healthcare setting, a treatment/resource in question may need to be allocated at a given frequency such as once a year, or once every two months. For medical treatments such as the prescription of drugs, the frequency of allocation may be decided by clinical best practice. However, for many other treatments, such as receiving a check-up from a nurse/doctor/other health care worker, the frequency of the check-up is more subjective. One example of this type of problem is allocating house call visits. A house call visit may comprise a resource where individuals may receive a call from a nurse practitioner in their own home to review their medical situation. While it may be ideal to provide every patient a house call visit once per year, there may be more optimum ways to allocate the limited number of house call visits available.

FIG. 11 illustrates an exemplary time decaying benefit of a resource in a healthcare setting. According to certain embodiments of the present disclosure, a resource allocation machine learning framework may also be used to identify which subgroup of individuals would benefit the most from a house call visit as well as estimate the time period over which the benefit from the treatment decays. For example, FIG. 11 depicts causal inference techniques, as described herewith, may determine that the benefit of a house call visit resource is initially very strong for men with diabetes, but the clinical benefit of this visit decays over time, and approximately after six months, the benefit of the visit has entirely dissipated. In comparison, causal inference techniques may determine that for women with cancer, the benefit of the house call visit resource is smaller and more sustained, so that the benefit is still experienced 12 months later. This information can be used to resource allocation decisions, for example, a group needs a house call visit resource once every six months but for another group once a year is sufficient.

Accordingly, as described above, various embodiments of the present disclosure make important technical contributions to improving allocation of limited resources. In particular, various embodiments of the present disclosure determine given ones of a plurality of resource-requesting entities benefit most from intervention, prioritize the given resource-requesting entities, and allocate resources based at least in part on the prioritized resource-requesting entities. In doing so, the techniques described herein improve performance, e.g., resource-to-benefit, outcomes of any given computing system. Accordingly, the techniques described herein improve at least one of the computational efficiency, storage-wise efficiency, and speed of computational systems.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:

receiving, by one or more processors and using a machine learning framework comprising a first machine learning model and a second machine learning model, historical data comprising a plurality of variables corresponding to (i) a plurality of actions and inactions with respect to a plurality of resource-requesting entities, and (ii) a plurality of outcomes corresponding to the plurality of actions and inactions;

inputting, by the one or more processors, the historical data to the machine learning framework to receive one or more causal effect predictions, wherein:

(a) the first machine learning model is configured to generate a predictive risk score associated with an event based at least in part on the historical data (b) the second machine learning model is configured to;

(1) receive at least a portion of the historical data, the predictive risk score, and a directed acyclic graph data, and (2) generate the one or more causal effect predictions on an outcome of interest from an action taken on a given resource-requesting entity of the plurality of resource-requesting entities based at least in part on the predictive risk score, at least the portion of the historical data, and the directed acyclic graph data, and (c) training the second machine learning model comprises:

(1) determining causal effect values for the plurality of resource-requesting entities based at least in part on the predictive risk score, at least the portion of the historical data, and the directed acyclic graph data, (2) apportioning the plurality of resource-requesting entities into a plurality of resource-requesting entity subgroups, and (3) ranking the plurality of resource-requesting entity subgroups by magnitude of the causal effect values, wherein the one or more causal effect predictions are based at least in part on the ranking of the plurality of resource-requesting entity subgroups;

determining, by the one or more processors, a subset of the plurality of resource-requesting entity subgroups based at least in part on the one or more causal effect predictions; and initiating, by the one or more processors, performance of one or more prediction-based actions based at least in part on the subset of the plurality of resource-requesting entity subgroups.

2. The computer-implemented method of claim 1, wherein the one or more prediction-based actions comprise prioritizing resource allocation to the subset of the plurality of resource-requesting entity subgroups.

3. The computer-implemented method of claim 1, wherein the plurality of resource-requesting entities comprise member data objects associated with a need for one or more resources through the plurality of actions.

4. The computer-implemented method of claim 1, wherein the predictive risk score comprises a dimensionality reduction of the historical data.

5. The computer-implemented method of claim 1, wherein the first machine learning model comprises a time-based predictive machine learning model.

6. The computer-implemented method of claim 1, wherein the second machine learning model comprises one or more causal inference types according to at least one of: backdoor linear regression, propensity scoring and matching, and instrumental variable analysis.

7. The computer-implemented method of claim 6, further comprising determining the one or more causal inference types based at least in part on the directed acyclic graph data.

8. A system comprising:

one or more processors; and at least one memory storing processor-executable instructions that, when executed by the one or more processors, cause the one or more processors to:

receive, using a machine learning framework comprising a first machine learning model and a second machine learning model, historical data comprising a plurality of variables corresponding to (i) a plurality of actions and inactions with respect to a plurality of resource-requesting entities, and (ii) a plurality of outcomes corresponding to the plurality of actions and inactions;

inputting, by the one or more processors, the historical data to the machine learning framework to receive one or more causal effect predictions, wherein:

(a) the first machine learning model is configured to generate a predictive risk score associated with an event based at least in part on the historical data (b) the second machine learning model is configured to:

(1) receive at least a portion of the historical data, the predictive risk score, and a directed acyclic graph data, and (2) generate the one or more causal effect predictions on an outcome of interest from an action taken on a given resource-requesting entity of the plurality of resource-requesting entities based at least in part on the predictive risk score, at least the portion of the historical data, and the directed acyclic graph data, and (c) training the second machine learning model comprises:

(1) determining causal effect values for the plurality of resource-requesting entities based at least in part on the predictive risk score, at least the portion of the historical data, and the directed acyclic graph data, (2) apportioning the plurality of resource-requesting entities into a plurality of resource-requesting entity subgroups, and (3) ranking the plurality of resource-requesting entity subgroups by magnitude of the causal effect values, wherein the one or more causal effect predictions are based at least in part on the ranking of the plurality of resource-requesting entity subgroups;

determine a subset of the plurality of resource-requesting entity subgroups based at least in part on the one or more causal effect predictions; and initiate performance of one or more prediction-based actions based at least in part on the subset of the plurality of resource-requesting entity subgroups.

9. The system of claim 8, wherein the one or more prediction-based actions comprise prioritizing resource allocation to the subset of the plurality of resource-requesting entity subgroups.

10. The system of claim 8, wherein the plurality of resource-requesting entities comprise member data objects associated with a need for one or more resources through the plurality of actions.

11. The system of claim 8, wherein the predictive risk score comprises a dimensionality reduction of the historical data.

12. The system of claim 8, wherein the first machine learning model comprises a time-based predictive machine learning model.

13. The system of claim 8, wherein the second machine learning model comprises one or more causal inference types according to at least one of: backdoor linear regression, propensity scoring and matching, and instrumental variable analysis.

14. The system of claim 13, wherein the one or more processors are further caused to: determine the one or more causal inference types based at least in part on the directed acyclic graph data.

15. One or more non-transitory computer-readable storage media including instructions that, when executed by one or more processors, cause the one or more processors to:

receive, using a machine learning framework comprising a first machine learning model and a second machine learning model, historical data comprising a plurality of variables corresponding to (i) a plurality of actions and inactions with respect to a plurality of resource-requesting entities, and (ii) a plurality of outcomes corresponding to the plurality of actions and inactions;

inputting, by the one or more processors, the historical data to the machine learning framework to receive one or more causal effect predictions, wherein:

(a) the first machine learning model is configured to generate a predictive risk score associated with an event based at least in part on the historical data (b) the causal inference second machine learning model is configured to;

(1) receive at least a portion of the historical data, the predictive risk score, and a directed acyclic graph data, and (2) generate the one or more causal effect predictions on an outcome of interest from an action taken on a given resource-requesting entity of the plurality of resource-requesting entities based at least in part on the predictive risk score, at least the portion of the historical data, and the directed acyclic graph data, and (c) training the second machine learning model comprises:

(1) determining causal effect values for the plurality of resource-requesting entities based at least in part on the predictive risk score, at least the portion of the historical data, and the directed acyclic graph data, (2) apportioning the plurality of resource-requesting entities into a plurality of resource-requesting entity subgroups, and (3) ranking the plurality of resource-requesting entity subgroups by magnitude of the causal effect values, wherein the one or more causal effect predictions are based at least in part on the ranking of the plurality of resource-requesting entity subgroups;

determine a subset of the plurality of resource-requesting entity subgroups based at least in part on the one or more causal effect predictions; and initiate performance of one or more prediction-based actions based at least in part on the subset of the plurality of resource-requesting entity subgroups.

16. The one or more non-transitory computer-readable storage media of claim 15, wherein the one or more prediction-based actions comprise prioritizing resource allocation to the subset of resource-requesting entity subgroups.

17. The one or more non-transitory computer-readable storage media of claim 15, wherein the plurality of resource-requesting entities comprise member data objects associated with a need for one or more resources through the plurality of actions.

18. The one or more non-transitory computer-readable storage media of claim 15, wherein the predictive risk score comprises a dimensionality reduction of the historical data.

19. The one or more non-transitory computer-readable storage media of claim 15, wherein the first machine learning model comprises a time-based predictive machine learning model.

20. The one or more non-transitory computer-readable storage media of claim 15, wherein the second machine learning model comprises one or more causal inference types according to at least one of: backdoor linear regression, propensity scoring and matching, and instrumental variable analysis.

* * * * *